Oct. 2, 1956   C. GIELOW ET AL   2,765,153
PROCESS AND MEANS FOR HANDLING PLASTIC MASSES
Filed Nov. 12, 1952   2 Sheets-Sheet 2
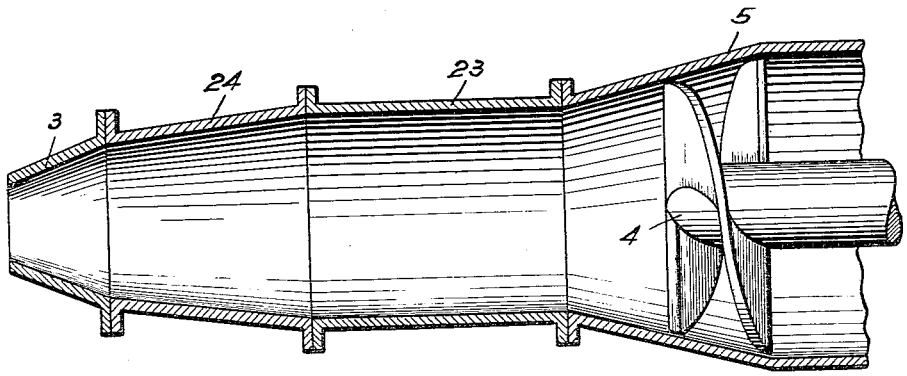
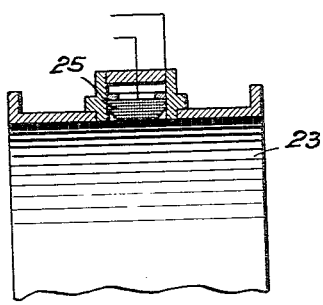
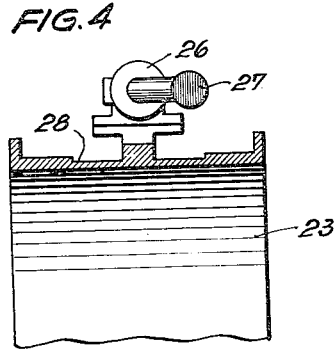
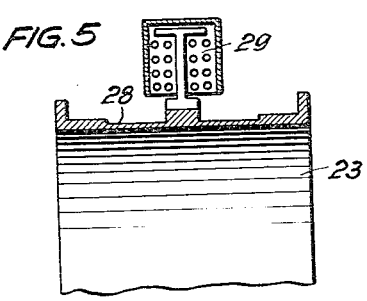
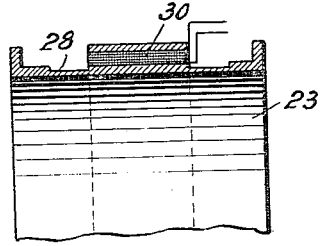
INVENTORS
CHRISTIAN GIELOW
HANS WERNER HAGEN United States Patent Office 2,765,153
Patented Oct. 2, 1956

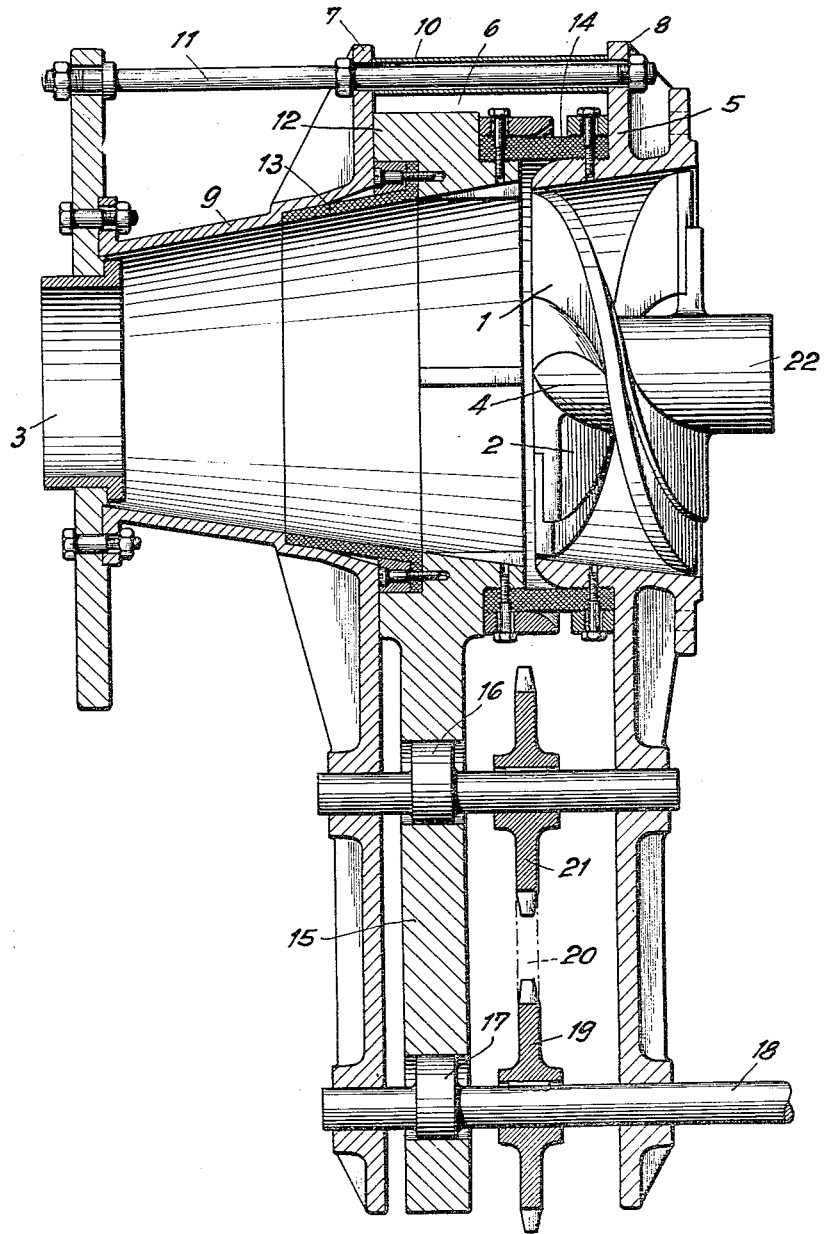

2,765,153
PROCESS AND MEANS FOR HANDLING PLASTIC MASSES

Christian Gielow, Dusseldorf-Oberkassel, and Hans Werner Hagen, Buederich, near Dusseldorf, Germany Application November 12, 1952, Serial No. 319,986
Claims priority, application Germany November 14, 1951

4 Claims. (Cl. 259—2)

The invention relates to process and means for handling plastic masses, in particular ceramic masses.

In the processing of doughy material or plastic masses, particularly in kneading, molding and transporting the same by means of screw conveyors, the points at which the material has been in contact with kneading or like parts form boundary surfaces which, during deformation of the mass produce in the interior of the final product, undesirable structures and cause cracks, gaps, fissures or flaws therein, because the material fails to bind itself again cohesively along such boundary surfaces.

In the industrial dressing treatment or preparation of stone-and earthenware, in particular in the porcelain manufacture, these flaw structures are particularly disagreeable because they destroy the homogeneity of the mass and impair the quality of the fired or finished product.

It is the purpose of the invention to provide means eliminating the aforesaid defects.

According to the invention, the materials or masses after having being treated or processed whereby formation of flaws occurs, are exposed to the action of pressure-vibrations.

It is therefore an object of the invention to provide means affording the step of imparting either mechanically generated pressure-vibrations or sonic or supersonic vibrations of any kind onto said masses.

It is another object of the invention to provide means facilitating variations in the frequency of these pressure-vibrations which may be adjusted or tuned with particular advantage to the natural frequency of the material under treatment.

A device for practicing such a pressure-vibration is characterized by movable means which can be affected or influenced by pressure-vibrations, and which may be arranged subsequently or successively to the device giving rise to the aforesaid flaws. Such movable means may be located between the flaw-causing device and its outlet or mouthpiece, or the outlet itself may form the vibratory movable means. According to a particular embodiment of the invention, said movable means or element may be rendered at least partially elastic. Such element may comprise a tube interposed between conveyor screw and the outlet thereof, said tube being fitted into the conveyor tube by means of elastic sleeves. This conical tube may be moved from the drive of the mixer by means of an eccentric mechanism.

Another embodiment of the invention, wherein compressive vibrations in the form of sonic vibrations are employed, is characterized by at least one sonic generator arranged following the flaw-causing device and acting on the circumference of the emerging extruded mass. Preferably, the form of vibration and natural frequency of the vibratory device may be adjusted to the given cross-section of the extruded mass, or of the conveyor tube. The tube may be flexibly constructed or mounted, and serve as a support for the vibratory device. The natural frequency of the tube can be controlled by variously introducing or removing additional masses. The vibratory generator may further comprise polarized crystals preferably of barium titanate. The polarized crystals may be in the form of a tube, and may be excited to provide diametral oscillations. Finally, the tube may be fitted with a wear-reducing internal liner.

Other features and characteristics of the invention will appear from the ensuing description, wherein the invention will be explained by several embodiments, shown in the accompanying drawings.

In the drawings:

Fig. 1 is a partial longitudinal section through the front portion of an extrusion press with conveyor screw for working ceramic masses and made according to the invention;

Fig. 2 shows schematically a longitudinal section through a similar machine, but illustrating another embodiment of the invention;

Fig. 3 shows schematically a longitudinal section through the vibrating part of a machine, similar to that of Fig. 2, having incorporated a sonic vibrator;

Fig. 4 is a longitudinal section similar to that of Fig. 3, with imbalance vibrator;

Fig. 5 is a longitudinal section similar to that of Fig. 3, with magnetomotive vibrator;

Fig. 6 is a longitudinal section similar to that of Fig. 3, with polarized-crystal vibrator.

Referring now more particularly to the attached drawings, there is disclosed how plastic or semi-plastic and semi-dry masses may be processed by kneading, molding and conveying by means of screws producing boundary surfaces, known as flaws, in the mass. In an extrusion press according to Fig. 1, such boundary surfaces would be formed in the mass as it leaves the screw passages 1, 2, of the kneading chamber and would not be eliminated in the course of subsequent extrusion through the outlet 3, unless the mass, on its way from the screw 4 to the outlet 3, is treated according to the invention.

The invention is based on the discovery that the flaws produced by the treatment (kneading and like) device, for example the screw 4, must be overcome by frictional action among the neighboring parts of the mass in order to permit homogeneous extrusion from the mouth 3. For this reason, the mass emerging from the conveying means 4 (which, in cases other than that of the extrusion press mentioned by way of example, may of course be of different form) which is responsible for the flaws, is subjected to pressure vibrations which accomplish the desired result. These vibrations may be generated in various ways, for example, mechanically by vibratory means or mechanisms, or by means of sonic vibrations of any kind or value, such as supra- or infrasonic vibrations, or audible sound vibrations.

In the embodiment of Fig. 1, the mass is subjected to mechanical pressure-vibrations. Behind the conveyor tube 5 housing the end of the conveyor screw 4, there is a free space 6 bounded e. g. by the flanges 7, 8 of the conical outlet tube 9 and/or the conveyor tube 5, and determined by spacer sleeves 10 on anchor rods 11. Within this space, there moves an internally frustoconical conduit or tube 12 tightly connected to both the conveyor tube and the outlet tube 9 by elastic sleeves 13, 14.

The tube 12 has a projection 15 engaged by eccentrics 16, 17 which, via shaft 18 and sprocket drive 19, 20, 21, derive motion from the drive mechanism of the screw shaft 22 (not shown). It is apparent that when the extrusion press of Fig. 1 with movably mounted tube 12 is started, all boundary surfaces will be destroyed immediately upon discharge of the mass from the conveyor tube 5, the particles of the discharged mass being rubbed together at said boundary surfaces. This effect may be further increased or improved by operating the tube 12 in a direction opposite to the rotation of the screw 4. High compression then aids in producing homogeneity of the finally extruded mass. The elastic sleeves 13, 14 enable the movable tube 12 to execute its movement without hindrance, at the same time ensuring the necessary density of the mass.

The principle hereinabove set forth and carried out by mechanical pressure-vibrations, however, may alternatively be accomplished in other ways. Fig. 2 shows schematically an extrusion press in longitudinal section, so designed that any of a great variety of vibratory devices may be applied to it. Between the conveyor tube 5, in which the flaw-causing pressure screw 4 terminates, and the outlet or mouthpiece 2, there is disposed at least one preferably cylindrical tube 23 which, depending on the kind of material treated, is set in vibration by a suitable vibration generator (not shown) in such a way that the extrusion mass emerging from tube 5 may be subjected to pressure-vibrations in order to destroy or eliminate the boundary surfaces contained therein.

Tube 23 may be followed by a conical tube 24, which may also be provided with vibrators (not shown), if desired.

Figs. 3 to 6 exemplify some embodiments of vibration generators, such as may be provided in connection with tubes 23 and/or 24.

In Fig. 3, the vibration generator consists of quartz crystal 25 which generates ultra-sonic vibrations. The vibration generator 25 may be so designed as to act on the entire periphery of the tube 23, i. e. several quartz crystal units may be distributed around the periphery of the tube 23.

Fig. 4 schematically shows an eccentric-weight vibrator. The weight 27 caused to revolve by a motor 26 transmits vibratory movements to the tube 23, which is preferably provided with a reduced piece or groove 28, to which desired pressure vibrations are imparted for transmission to the extrusion mass.

Similar vibratory movements, as Fig. 5 indicates, may be produced by means of a magnetomotive vibrator 29; to generate low frequencies, known mechanical pressure-oscillation generators, such as vibrators, may be used.

In all of these cases, to reduce wear as the ceramic mass passes through, the tubular oscillator or vibrator may be provided with a wear-resistant suitable liner, e. g. in that the tube 23 may comprise a steel tube fixedly or detachably connected to the vibratory devices. Its dimensions may preferably be such as to adapt the form and natural frequency of vibration to those of the vibrator. This may for example, be accomplished by suitable choice of diameter and wall thickness. The tube may simultaneously serve as a flexible mounting for the vibrator, frequency adjustment being effected by suitable choice of diameter and wall thickness. Tuning and adjustment may be attained by providing the tube with cross-sectional changes, e. g. by means of grooves 28, which affect the elastic properties of the tube, and to which additional masses may be applied, for selective removal or replacement, in order to vary the natural frequency of the tube.

Of course, it is also possible to provide the outlet 3 itself with or to construct same as a vibratory device, as well as to distribute vibratory devices or means within a machine where the tendency to formation of boundary surfaces (flaws) exists.

Fig. 6 shows a tubular crystal vibrator comprising polarized crystals 30, for example of barium titanate, which longitudinally traverses the mass to be set in vibration, thus exposing it to the influence of sound waves. Crystal vibrators of this kind may advantageously be excited in so-called diametral oscillations. In this form of vibration, the primary change takes place in the diameter rather than in the geometrical shape of the vibrator, a motion which may be described as pulsation of a tubular vibrator.

The frequency of the pressure waves depends on the physical characteristics of the material to be treated, such as its grain size, specific weight, moisture content etc. It should be such that the several parts of the extrusion mass are set in violent motion and thereby rendered homogeneous. Since these physical characteristics of the mass may change in the course of the treatment the latter may if necessary be performed repeatedly, each time at a different frequency. In the case of materials which are molded into a desired shape, e. g. porcelain mass, treatment of the mass after it passes the last unit in which division or cutting of the mass takes place, i. e. after passing the last screw passage in the case of pressure screws, is particularly effective. In extrusion presses with pressure screws, it is desirable, as described, to locate the device between the pressure screw and the outlet for the mass.

The excitation of quartz, crystal and magnetomotive vibrators is effected in known manner by means of generators.

The invention is of course not restricted to the embodiments illustrated. It is applicable to all cases where it is desired, preferably in plastic masses, to eliminate boundary surfaces (flaws) formed in the course of handling or processing, or to prevent their formation.

Having thus described the invention, what is claimed as new and desired to be secured by Letters Patent, is:

1. A device for continuously producing a homogeneous plastic mass, in particular a ceramic mass, comprising, in combination, a chamber provided with helical means for kneading and advancing said mass, said chamber having inlet means and outlet means, respectively, positioned at opposite ends thereof, a conduit connected to said outlet means, and means for imparting pressure vibrations to said conduit in a direction perpendicular to the axis of said conduit, whereby upon introduction of said mass into said inlet means, said mass is kneaded by said helical means and advanced to said outlet means and in turn to said conduit wherein flaws introduced by said kneading are eliminated.

2. A device according to claim 1, including a further conduit positioned immediately beyond said first-mentioned conduit, said first-mentioned conduit being provided with a frusto-conical passageway, a first elastic sleeve connecting the larger end of said frusto-conical conduit to said outlet means, and a second elastic sleeve connecting the smaller end of said frusto-conical conduit to said further conduit, whereby said frusto-conical conduit may be subjected to pressure vibrations exclusively of said further conduit and said chamber.

3. A device according to claim 2, wherein said means for imparting pressure vibrations are adjustable in frequency.

4. The uninterrupted process of treating a dough-like plastic, ceramic and like highly flow-resistant mass, to free same of fissures, flaws and like deficiencies, comprising the steps of continuously subjecting said mass to kneading action to thereby effect homogenization of said mass, advancing said kneaded mass continuously into conduit means, subjecting said conduit means while said mass is advanced therein to pressure vibrations in a direction perpendicular to the direction of advance of said mass, controlling the frequency of said pressure vibrations in accordance with the composition of the material being subjected to said vibrations, to thereby homogenize said mass, and finally subjecting said mass to extrusion immediately after discharge from said conduit means.

References Cited in the file of this patent

UNITED STATES PATENTS

| | | |
|---|---|---|
| 2,093,898 | Taplin | Sept. 21, 1937 |
| 2,185,540 | Cady | Jan. 2, 1940 |
| 2,578,505 | Carlin | Dec. 11, 1951 |
| 2,585,103 | Fitzgerald | Feb. 12, 1952 |
| 2,611,589 | Pass et al. | Sept. 23, 1952 |
| 2,620,894 | Peterson et al. | Dec. 9, 1952 |